United States Patent
Divelbiss et al.

(12)

(10) Patent No.: US 7,299,099 B1
(45) Date of Patent: Nov. 20, 2007

(54) PROGRAMMABLE LOGIC CONTROLLER CONTAINED ON A CHIP

(75) Inventors: Donald S. Divelbiss, Howard, OH (US); Terry L. Divelbiss, Fredericktown, OH (US)

(73) Assignee: Divelbiss Corporation, Howard, OH (US)

( * ) Notice: Subject to any disclaimer, the term of this patent is extended or adjusted under 35 U.S.C. 154(b) by 214 days.

(21) Appl. No.: 11/051,988

(22) Filed: Feb. 4, 2005

(51) Int. Cl.
*G05B 11/01* (2006.01)
*G05B 19/42* (2006.01)

(52) U.S. Cl. .............................. 700/18; 700/7; 700/86

(58) Field of Classification Search ................. 700/18, 700/7, 86, 93, 121; 326/29, 40
See application file for complete search history.

(56) References Cited

U.S. PATENT DOCUMENTS

| | | | | |
|---|---|---|---|---|
| 4,680,698 A | * | 7/1987 | Edwards et al. | 712/37 |
| 4,704,678 A | * | 11/1987 | May | 718/106 |
| 4,724,717 A | * | 2/1988 | Chikuma | 74/498 |
| 4,967,326 A | * | 10/1990 | May | 712/21 |
| 5,031,092 A | * | 7/1991 | Edwards et al. | 711/163 |
| 5,243,698 A | * | 9/1993 | May | 709/201 |
| 5,491,359 A | * | 2/1996 | May et al. | 257/373 |
| 5,506,437 A | * | 4/1996 | May et al. | 257/373 |
| 5,854,907 A | * | 12/1998 | Caudel et al. | 710/100 |
| 6,414,368 B1 | * | 7/2002 | May et al. | 257/523 |
| 7,102,384 B1 | * | 9/2006 | Speers et al. | 326/39 |
| 7,102,391 B1 | * | 9/2006 | Sun et al. | 327/10 |
| 2005/0237083 A1 | * | 10/2005 | Bakker et al. | 326/47 |

* cited by examiner

*Primary Examiner*—Thomas K. Pham
(74) *Attorney, Agent, or Firm*—Calfree, Halter & Griswold LLP

(57) ABSTRACT

Various embodiments of a programmable logic controller and a system for programming a programmable logic controller are disclosed. One PLC embodiment comprises an I/O component, a processor, a memory component and a kernel, all contained within a chip.

36 Claims, 2 Drawing Sheets

PROGRAMMABLE LOGIC CONTROLLER CONTAINED ON A CHIP

This application claims the benefit of U.S. Provisional Patent Application No. 60/545,644, filed Feb. 18, 2004.

BACKGROUND OF THE INVENTION

A programmable logic controller, or a "PLC," is a small computer generally used for automation of real-world processes, such as, e.g., control of machinery on factory assembly lines. Modern PLC's are microprocessor-based devices with input/output ("I/O") functionality (usually input/output circuitry) which oftentimes monitors the status of field connected sensor inputs and controls certain output actuators according to user-created logic.

PLC's are generally modular devices, composed of separate parts such as, e.g., commercially available processor(s), memory chips, I/O devices, etc. As machinery and machine controllers continue to decrease in size, many PLC's have similarly decreased in size. In this light, many parts of a PLC have been integrated into a single package such as, e.g., I/O circuitry integral with a processor in a single integrated circuit or integrated circuit package ("chips," as defined herein). Integration of multiple parts into a single chip, however, has been limited.

The user-created logic which drives a PLC has evolved along with the size and integration of components. Such logic is typically stored in non-volatile memory communicating with or integral to the PLC's processor. User-created logic is typically created on a separate computing device, such as a personal computer or a workstation, and then transferred to the PLC's memory. This allows a streamlining of the internal logic which controls the PLC. While such streamlining is beneficial in terms of conserving storage space, the cost of such streamlining is limiting the internal logic to low-level processing. Such low-level processing is undesirable as it forces a user to either program the user-created logic at a low level, which is time consuming and requires a user knowledgeable regarding such low-level programming, or to perform high-level programming on the separate computing device, translate the programming to a lower-level, and transfer the logic to the PLC.

SUMMARY OF THE INVENTION

In accordance with one embodiment of the present invention, a programmable logic controller is provided. The programmable logic controller includes an input/output component, a processor, at least one memory component and a kernel, all contained within a chip.

In accordance with another embodiment of the present invention, a programmable logic controller is provided. The programmable logic controller includes an input/output component, a processor, a plurality of memory modules and kernel logic, all contained within a single chip.

In accordance with another embodiment of the present invention, a system for programming a PLC is provided. The system includes a computing device and application software creation logic electronically communicating with the PLC.

DETAILED DESCRIPTION OF THE INVENTION

The following includes definitions of exemplary terms used throughout the disclosure. Both singular and plural forms of all terms fall within each meaning. Except where noted otherwise, capitalized and non-capitalized forms of all terms fall within each meaning:

As used herein, "chip" is used generically and includes but is not limited to an integrated circuit package and/or an integrated circuit.

As used herein, "component" is used generically. A "component" of a chip is a physical or logic part of the chip which performs one or more functions. For example, an I/O device which is a component of a chip is optionally embodied in electrical circuitry which communicates with other components of the chip, such as, e.g., a processor and/or memory. The component is optionally embodied in circuitry, logic (e.g., within the logic of the chip) and/or in a physical device integral with the chip (e.g., a pin or a node). In an additional example, chips embodied in integrated circuit packages include components such as, e.g., I/O, one or more processors, and one or more memory modules. Exemplary components include, but are not limited to, a processor (e.g., a microprocessor), memory (e.g., flash, RAM, EEPROM) and I/O (e.g., serial port, CAN port).

As used herein, "kernel" is used generically and includes but is not limited to the core component of an operating system which performs at least basic functions such as allocating hardware resources and/or supporting basic session services required to transfer data and/or establish or release connections.

As used herein, "logic" is used generically and includes but is not limited to hardware, software and/or combinations of both to perform a function.

As used herein, "software" is used generically and includes but is not limited to one or more computer executable instructions, routines, algorithms, modules or programs including separate applications or from dynamically linked libraries for performing functions as described herein. Software can be maintained on various computer readable mediums as known in the art.

Figure 1:
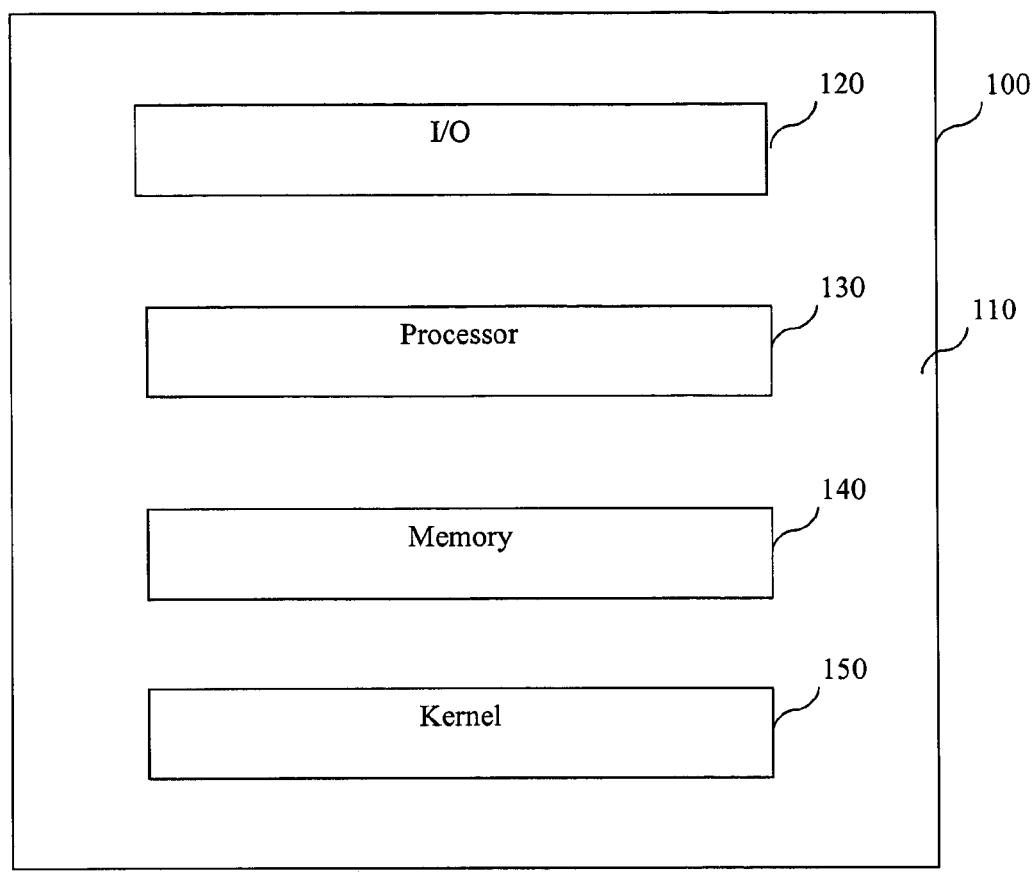
FIG. 1 is an exemplary block diagram of a PLC contained within a chip.

With reference to FIG. 1, an embodiment of a PLC on a chip 100 is shown. In this embodiment, PLC on a chip 100 includes at least one I/O component 120, at least one processor 130, at least one memory component 140 and a kernel 150 all contained within a chip 110.

Chip 110 is any chip capable of containing I/O component 120, processor 130, memory component 140 and kernel 150. Exemplary suitable chips 110 are any of the chips used in the PLC on a Chip available from Divelbiss Corporation of 9778 Mt. Gilead Road, Fredericktown, Ohio 43019. Any exemplary such chip is a 112LQFP Package Integrated Circuit. Other exemplary suitable chips 110 include, but are not limited to, QFP, BGA, LGA, SOIC, TQFP, DIP, PGA, die packages and other suitable packages. It will be appreciated that chip 110 is optionally an integrated circuit and further optionally an integrated circuit package.

I/O component 120 is any I/O device or component which facilitates input and/or output with the PLC. Exemplary I/O components 120 include, but are not limited to, digital inputs, digital outputs, analog inputs, PWM outputs, analog outputs, system watchdog output and controls check monitor, programming port(s) (e.g., com) and serial ports. It will be appreciated that any suitable I/O device or combination of I/O devices may be used. I/O component 120 is optionally embodied in logic, circuitry, physically (e.g., pins) or combinations thereof.

Processor 130 is any microprocessor which is capable of executing logical instructions for controlling the PLC. Exemplary processors 130 include, but are not limited to, the Freescale HCS08 family, the Freescale HCS12 family, the Freescale Coldfire family and the Freescale PowerPC family. While processor 130 has been described herein as a single processor, it will be appreciated that a plurality of processors 130 is optionally included (e.g., working in parallel). Processor 130 electrically communicates with I/O component(s) 120 in any suitable manner.

Memory component 140 is any memory module or combination of memory modules which are capable of storing logical instructions and/or data. Exemplary memory components 140 include, but are not limited to, flash memory (e.g., sizes 64 K, 128 K, 256 K, 512 K, etc.), EEPROM memory (e.g., sizes 1 K, 2 K, 4 K, etc.), RAM (e.g., sizes 4 K, 8 K, 12 K, 14 K, etc.) and non-volatile RAM. One memory component 140 or, optionally, a plurality of memory components 140, is/are used. For example, in an embodiment, three memory modules are used: one flash memory, one EEPROM memory and one RAM. Each module stores different data or instructions, such as, e.g., a kernel (described below), user-created logic, data, etc. It will be appreciated that processor 130, I/O components 120 and memory component(s) 140 electrically communicate in any suitable manner.

Figure 2:
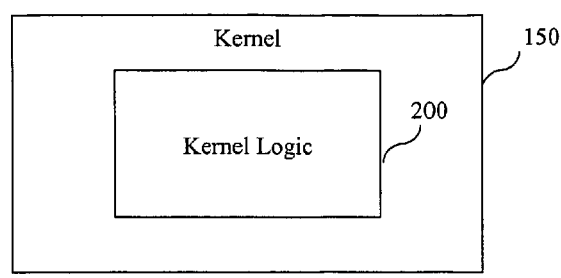
FIG. 2 is an exemplary block diagram of a component of a PLC contained within a chip.

Kernel 150 resides in one or more memory components 140. With reference to FIG. 2, Kernel 150 includes kernel logic 200. Kernel logic 200 includes any suitable steps, methods, processes and/or software for performing one or more (and/or combinations thereof) of the logical components set forth in Table 1:

TABLE 1

Ethernet logic
Modbus logic
LINBus logic
J1939 logic
J1850 logic
I2C logic
SPI logic
Graphic interface logic
Keypad/board interface logic
Display/interface logic
CAN logic
Real time clock logic
Quadrature counters logic
Absolute value function logic
ACOS arc cosine logic
ADD function logic
AND function logic
ASIN arc sine function logic
AVG average function logic
ATAN arc tangent function logic
BOOLEAN function converts the real/integer input into a Boolean output logic
CEIL function provides a rounded-up output logic
CMP compare function logic
COS cosine function logic
Direct coil logic
Direct contact logic
DIV divides function logic
Down counter logic
Equal to logic
EXP natural exponential function logic TABLE 1-continued EXPT provides exponentiation function logic
Falling edge detector logic
Flog logic
FLOOR function provides a rounded-down output logic
Get date logic
Get time logic
Greater than (>)logic
Greater than or equal to (>=)logic
Hyster logic
Integer logic
Inverted coil logic
Inverted contact logic
Less than (<)logic
Less than or equal to (<=)logic
LIMIT function provides a minimum and maximum output logic
LN function calculates the natural logarithm value logic
LOG function calculates the logarithm logic
MAX maximum function logic
MAVG moving average logic
MIN minimum function logic
MOD modulo value logic
MULT multiplies function logic
MUX function acts as a selector for multiple inputs logic
MAVG moving average function logic
NOT function proves bit to bit negation logic
Not equal to (<>)logic
Off delay timer logic
On delay timer logic
OR logic
Pulse timer logic
RANDOM seed random value logic
REAL function coverts the P input into a real output logic
Rising edge detector logic
ROL logic
ROR right bit rotation function logic
RS reset dominant bistable function logic
SEED function provides the number which the RANDOM function uses logic
SEL selection function logic
Set date logic
Set time logic
SHL left bit shift function logic
SHR right bit shift function logic
SIN sine function logic
SQRT square roof value function logic
SR set dominant bistable function logic
SUB subtract function logic
TAN tangent function logic
Up counter logic
Up/down counter logic
XOR bitwise exclusive function logic
Touch screen logic
PID logic
Fuzzy logic
Drum Seq. logic
Shift Reg. logic
Modem/cell phone interface logic
Network drivers logic
Internal control relays logic
Retentive control relays, timers, counters and drum sequencers logic
User math function block logic Each kernel logic component set forth in Table 1 includes any suitable steps, methods, processes and/or software for performing the function which identifies the component (e.g., "greater than," "get date," "CAN," "display/interface," "Ethernet") according to industry standards relating to each such function. For example, "Ethernet logic" includes any suitable steps, methods, processes and/or software for facilitating network communication under industry Ethernet standards. In an additional example, "get date" logic includes any suitable steps, methods, processes and/or software for obtaining the current date. In yet another example, "greater than" logic includes any suitable steps, methods, processes and/or software for comparing two values and determining whether one value is greater than the other.

In an embodiment, kernel logic 200 includes any suitable steps, methods, processes and/or software for providing PLC functionality. For example, as discussed below, application logic for a PLC of the current invention is optionally created on a personal computer or workstation, then compiled (or interpreted) into a format that is executable by the PLC. Kernel logic 200 provides PLC functionality for facilitating execution of the compiled (or interpreted) logic. Kernel logic 200 acts as a lower layer, an interface between the hardware components of the PLC and the upper layer application program (e.g., the compiled logic), and further runs the application program as necessary. In an embodiment wherein an application creation program (e.g., application software creation logic, as described below) provides a high-level user GUI (such as a graphical ladder interface), kernel logic 200 includes any suitable steps, methods, processes and/or software for running the application software created by such creation software (by either compilation or interpretation) in the PLC and provides PLC functionality to facilitate such running.

With reference again to FIG. 1, PLC on a chip 100 further optionally integrates one or more (or combinations thereof) of the following components/features contained within chip 110: CAN, network interfaces, programmable logic, closed loop control, interrupts, ability to interface to external memory, counters, interface for diagnostics, timers, peripheral communications interface, security, low voltage reset, low voltage interrupt, low power modes (stop mode, pseudo stop mode, and wait mode), wake up interrupt inputs, on board voltage regulation and wide temperature operating range. PLC on a chip 100 further optionally includes one or more external program interfaces, including but not limited to: ladder diagram and function block compiler (described herein), instruction list, structured text, sequential function chart, flow chart, monitor, reverse compiler, timing diagrams and data logging.

Figure 3:
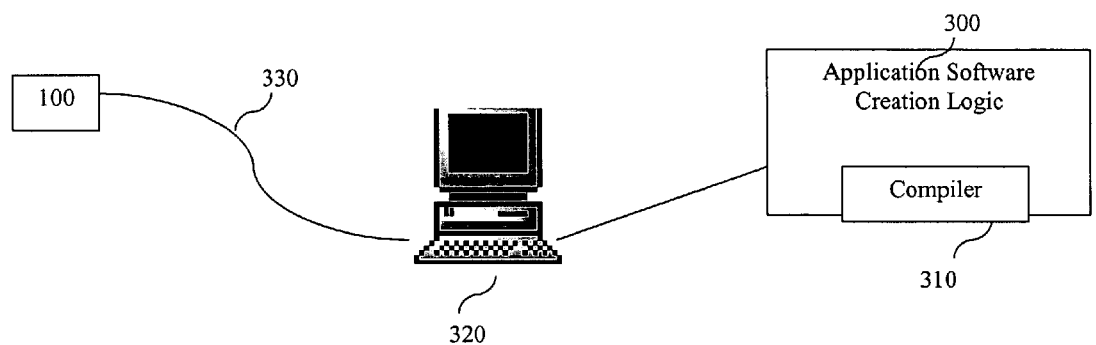
FIG. 3 is an exemplary diagram of a system for programming a PLC contained within a chip.

With reference to FIG. 3, in an embodiment, a system for programming a PLC contained in a chip is shown. PLC on a chip 100 electronically communicates 330 with a computing device 320 running therein application software creation logic 300. Electronic communication 330 is accomplished via any suitable interface, including but not limited to I/O described herein. Computing device 320 is any computing device capable of executing application software creation logic 300, including but not limited to a personal computer and a workstation.

Application software creation logic 300 includes any suitable steps, methods, processes and/or software for creating one or more applications (or "user-created logic") which are performable on PLC on a chip 100. Application software creation logic 300 optionally includes a compiler 310 for compiling an application created with application software creation logic 300 into a format executable by PLC on a chip 100. An exemplary suitable application software creation logic 300 including a complier 310 is the EZ LADDER suite and compiler available from Divelbiss Corporation. Alternatively and/or additionally, application software creation logic 300 optionally includes an interpreter (not shown) for interpreting such an application created with application software logic 300. It will be appreciated that for applications which are interpreted, the interpreter is physically and/or logically located in any suitable place (i.e., in the kernel, in the application software creation logic, etc).

A user accesses application software creation logic 300 to create, edit or modify an application for PLC on a chip 100, and further to compile (or interpret) the application for execution on PLC on a chip 100. In the EZ LADDER suite example, a user is given a graphical ladder interface and the ability to point, click and drag objects to create or modify a ladder diagram. The ladder diagram is complied into a form executable via kernel 150 on PLC on a chip 100, and the executable application is communicated 330 to the PLC, wherein it is stored in a memory component 140.

It will be appreciated that kernel logic 200 (with reference to FIG. 2) is optionally adapted to work with application software creation logic 300 and compiler 310 to optimize application logic components. In this embodiment, application software creation logic 300 and compiler 310 convert user input into an executable application which is optimized for execution by kernel logic 200. The application may thus be streamlined to, e.g., take up less memory space in the PLC. Furthermore, programming capabilities allows a user to program the PLC without needing an in-depth understanding of low-level programming. While the above examples have described a system wherein a ladder diagram is used to create an application, it will be appreciated that application software creation logic 300 optionally uses any suitable method to facilitate creation of an application, and this disclosure is thus not limited to use of a ladder diagram.

While the present invention has been illustrated by the description of embodiments thereof, and while the embodiments have been described in considerable detail, the scope of the appended claims should not be restricted or in any way limited to such detail. Additional advantages and modifications will readily appear to those skilled in the art. Therefore, the invention, in its broader aspects, is not limited to the specific details, the representative systems, and illustrative examples shown and described. Accordingly, departures may be made from such details without departing from the spirit or scope of the invention disclosed herein.

What is claimed is:

1. A programmable logic controller comprising:
   at least one input/output component;
   at least one processor in communication with the at least one input/output component;
   at least one memory component in communication with the at least one processor and adapted to store a PLC application program; and
   an operating system kernel stored in the at least one memory component and providing the at least one processor with an interface layer to run the PLC application program, monitor any inputs associated with the at least one input/output component, and control any outputs associated with the at least one input/output component in response to the PLC application program and the monitored inputs;
   wherein the at least one input/output component, the at least one processor, and the at least one memory component are contained within a chip.

2. The programmable logic controller of claim 1, the at least one input/output component including:
   at least one of a digital input, a digital output, an analog input, and an analog output.

3. The programmable logic controller of claim 1, the at least one input/output component including:
   a system watchdog output; and
   a controls check monitor.

4. The programmable logic controller of claim 1, the at least one input/output component including:
   at least one of a programming port, a serial port, a CAN port, and an Ethernet interface.

5. The programmable logic controller of claim 1, the at least one processor including:
a plurality of processors.

6. The programmable logic controller of claim 5 wherein the plurality of processors work in parallel.

7. The programmable logic controller of claim 1, the at least one memory component including:
at least one of a flash memory module, an EEPROM memory module, a volatile RAM memory module, and a non-volatile RAM memory module.

8. The programmable logic controller of claim 1, the operating system kernel including:
a plurality of logical components associated with running the PLC application program.

9. The programmable logic controller of claim 1, the operating system kernel including:
an interpreter for interpreting the PLC application program in conjunction with running the PLC application program.

10. The programmable logic controller of claim 1, the operating system kernel including:
a dynamically linked library for use in conjunction with running the PLC application program.

11. The programmable logic controller of claim 1, the operating system kernel including:
a compiler for compiling a PLC application software package to form the PLC application program.

12. The programmable logic controller of claim 11 wherein the at least one memory component is adapted to store the PLC application software package.

13. The programmable logic controller of claim 1, the chip including:
a flat pack package.

14. The programmable logic controller of claim 13, the flat pack package including:
any one of the group formed by a quad flat pack package, a low profile quad flat pack package, and a thin quad flat pack package.

15. The programmable logic controller of claim 1, the chip including:
any one of the group formed by a grid array package, a small outline integrated circuit package, a dual in-line package, and a die package.

16. A programmable logic controller comprising:
an input/output component;
a processor in communication with the input/output component;
a plurality of memory modules in communication with the processor and adapted to store a PLC application program; and
a kernel logic stored in at least one of the plurality of memory modules and providing the processor with an interface layer to run the PLC application program, monitor any inputs associated with the input/output component, and control any outputs associated with the input/output component in response to the PLC application program and the monitored inputs;
wherein the input/output component, the processor and the plurality of memory modules are contained within a chip.

17. The programmable logic controller of claim 16, the plurality of memory modules including:
at least one of a flash memory module, an EEPROM memory module, a volatile RAM memory module, and a non-volatile RAM memory module.

18. The programmable logic controller of claim 16, the input/output component including:
a system watchdog output; and
a controls check monitor.

19. The programmable logic controller of claim 16, the input/output component including:
at least one of a programming port, a serial port, a CAN port, and an Ethernet interface.

20. The programmable logic controller of claim 16, the kernel logic including:
a plurality of logical components associated with running the PLC application program.

21. The programmable logic controller of claim 16, the chip including:
a flat pack package.

22. The programmable logic controller of claim 21, the flat pack package including:
any one of the group formed by a quad flat pack package, a low profile quad flat pack package, and a thin quad flat pack package.

23. A system for programming a programmable logic controller contained within a chip, comprising:
a computing device electronically communicating with the programmable logic controller; and
application software creation logic, running on the computing device, for creating a PLC application program for running on the programmable logic controller, such that the programmable logic controller runs the PLC application program, monitors any inputs associated with the chip, and controls any outputs associated with the chip in response to the PLC application program and the monitored inputs;
wherein the PLC application program is electronically communicated by the computing device to the programmable logic controller for execution.

24. The system of claim 23, the application software creation logic including:
a graphical ladder interface providing a user with access to the computing device to create, edit, or modify the PLC application program.

25. The system of claim 24 wherein the graphical ladder interface allows the user to create, edit, or modify the PLC application program by creating, editing, or modifying a ladder diagram.

26. The system of claim 25 wherein the graphical ladder interface allows the user to create, edit, or modify the ladder diagram by pointing, clicking, and dragging objects.

27. The system of claim 23, further including:
a programmable logic controller, including:
a first input/output component and at least one additional input/output component;
a processor in communication with the each input/output component;
at least one memory component in communication with the processor and adapted to store the PLC application program; and
an operating system kernel stored in the at least one memory component and providing the processor with an interface layer to run the PLC application program, monitor any inputs associated with the at least one additional input/output component, and control any outputs associated with the at least one additional input/output component in response to the PLC application program and the monitored inputs;
wherein the first input/output component, the at least one additional input/output component, the processor, and the at least one memory component are contained within the chip;

wherein the application software creation logic is also for editing or modifying the PLC application program and the computing device is adapted to communicate the PLC application program to the programmable logic controller via the first input/output component.

28. The system of claim 27 further including a compiler for compiling the application program.

29. The system of claim 28 wherein the compiler is disposed within the computing device and associated with the application software creation logic.

30. The system of claim 28 wherein the compiler is disposed within the programmable logic controller and associated with the operating system kernel.

31. The system of claim 27 further including an interpreter for interpreting the application program.

32. The system of claim 31 wherein the interpreter is disposed within the computing device and associated with the application software creation logic.

33. The system of claim 31 wherein the interpreter is disposed within the programmable logic controller and associated with the operating system kernel.

34. The system of claim 27, the first input/output component including:

at least one of a programming port, a serial port, a CAN port, and an Ethernet interface.

35. The system of claim 27, the operating system kernel including:

a plurality of logical components associated with running the PLC application program.

36. The system of claim 27 wherein the operating system kernel and the application software creation logic interact to optimize the PLC application program for operation of the programmable logic controller.

* * * * *

UNITED STATES PATENT AND TRADEMARK OFFICE
CERTIFICATE OF CORRECTION

| | | |
|---|---|---|
| PATENT NO. | : 7,299,099 B1 | Page 1 of 1 |
| APPLICATION NO. | : 11/051988 | |
| DATED | : November 20, 2007 | |
| INVENTOR(S) | : Donald S. Divelbiss et al. | |

It is certified that error appears in the above-identified patent and that said Letters Patent is hereby corrected as shown below:

On the Title page of the patent, please insert the following:

Related U.S. Application Data

Item
(60) Provisional Application Serial No. 60/545,644, filed Feb. 18, 2004.

On the Title page of the patent, item (73), please change the city of the Assignee from "Howard" to read: --Fredericktown--.

Signed and Sealed this

First Day of April, 2008

JON W. DUDAS
*Director of the United States Patent and Trademark Office*